(12) United States Patent
Sharma et al.

(10) Patent No.: US 10,737,183 B1
(45) Date of Patent: Aug. 11, 2020

(54) SMART STREAMING

(71) Applicant: BlueStack Systems, Inc., Campbell, CA (US)

(72) Inventors: Shashi Kant Sharma, Haryana (IN); Sabrina Marie Waun-Mei Li, San Jose, CA (US); Julia Larson, Davis, CA (US); David P. Reese, Jr., Sunnyvale, CA (US)

(73) Assignee: BlueStack Systems, Inc., Campbell, CA (US)

( * ) Notice: Subject to any disclaimer, the term of this patent is extended or adjusted under 35 U.S.C. 154(b) by 437 days.

(21) Appl. No.: 15/336,528

(22) Filed: Oct. 27, 2016

Related U.S. Application Data

(60) Provisional application No. 62/247,121, filed on Oct. 27, 2015.

(51) Int. Cl.
 - *A63F 13/86* (2014.01)
 - *A63F 13/35* (2014.01)
 - *A63F 13/335* (2014.01)

(52) U.S. Cl.
 CPC ............ *A63F 13/86* (2014.09); *A63F 13/335* (2014.09); *A63F 13/35* (2014.09)

(58) Field of Classification Search
 CPC ........ A63F 13/355; A63F 13/30; A63F 13/86; A63F 13/335; A63F 13/35; H04L 67/38
 See application file for complete search history.

(56) References Cited

U.S. PATENT DOCUMENTS

| | | | |
|---|---|---|---|
| 8,556,724 B2 * | 10/2013 | Dale | H04L 67/1002 463/42 |
| 9,358,467 B2 * | 6/2016 | Lee | A63F 13/12 |
| 10,037,656 B2 * | 7/2018 | Boudreau | G07F 17/3244 |
| 2005/0193015 A1 * | 9/2005 | Logston | G06F 16/44 |
| 2012/0027379 A1 * | 2/2012 | Thompson | H04N 5/76 386/241 |
| 2012/0040754 A1 * | 2/2012 | Dutilly | A63F 13/493 463/30 |
| 2012/0100910 A1 * | 4/2012 | Eichorn | H04N 21/43615 463/31 |
| 2013/0210526 A1 * | 8/2013 | Kim | H04L 67/1002 463/42 |
| 2014/0274387 A1 * | 9/2014 | Lewis | A63F 13/00 463/31 |
| 2015/0126282 A1 * | 5/2015 | Hitomi | A63F 13/355 463/42 |
| 2015/0375113 A1 * | 12/2015 | Justice | A63F 13/355 463/42 |
| 2017/0050111 A1 * | 2/2017 | Perry | A63F 13/355 |

* cited by examiner

*Primary Examiner* — William H McCulloch, Jr.
*Assistant Examiner* — Ankit B Doshi
(74) *Attorney, Agent, or Firm* — The Webb Law Firm

(57) ABSTRACT

Embodiments of the present invention are directed to ancillary game data. Ancillary game data, including game state events and/or visual/audio elements, is generated from and stored in association with raw or original game play footage by a game state data (GSD) service. The ancillary game data is available for subsequently composition back with the corresponding original media stream, thereby generating a smart media stream, for viewers to consume. Game state events are available for searching and sorting archived media streams or for performing general data mining.

18 Claims, 10 Drawing Sheets

SMART STREAMING

RELATED APPLICATIONS

This application claims benefit of priority under 35 U.S.C. section 119(e) of the U.S. Provisional Patent Application Ser. No. 62/247,121, filed Oct. 27, 2015, entitled "Smart Streaming," which is hereby incorporated by reference in its entirety.

FIELD OF INVENTION

The present invention is related to the field of media streaming. More specifically, the present invention relates to smart streaming.

BACKGROUND OF THE INVENTION

There exist video game streaming services that allow users to play games and broadcast game plays online for viewers to consume, either in realtime or at a later point in time. Viewers can follow streams for specific games. However, these streams are simply raw game play footage that do not provide the viewers with highlights and do not include any added value. Thus, there is a need for an enhanced viewer experience while viewing game plays.

BRIEF SUMMARY OF THE INVENTION

Embodiments of the present invention are directed to ancillary game data. Ancillary game data, including game state events and/or visual/audio elements, is generated from and stored in association with raw or original game play footage by a game state data (GSD) service. The ancillary game data is available for subsequently composition back with the corresponding original media stream, thereby generating a smart media stream, for viewers to consume. Game state events are available for searching and sorting archived media streams or for performing general data mining.

In one aspect, a non-transitory computer-readable medium is provided. The non-transitory computer-readable medium stores instructions that, when executed by a computing device, cause the computing device to perform a method. The method includes obtaining by the server ancillary game data associated with a raw video game stream that is stored remotely from the server, and maintaining by the server the ancillary game data associated with the raw video game stream in a data store that is communicatively coupled with the server.

In some embodiments, the ancillary game data associated with the raw video game stream is obtained by communicatively coupling with an end-user streaming device over a network, and receiving by the server the ancillary game data from the end-user streaming device.

In some embodiments, the ancillary game data associated with the raw video game stream is obtained by the server accessing server the raw video game stream over a network, and performing by the server image processing on the raw video game stream, thereby creating by the server the ancillary game data that is associated with the raw video game stream.

The server can access the raw video game stream by receiving the raw video game stream streamed from an end-user streaming device, and after the image processing, transmitting the raw video game stream to a streaming service over the network. Alternatively, the server can access the raw video game stream by communicatively coupling with a streaming service over the network and receiving the raw video game stream streamed from the streaming service.

The ancillary game data associated with the raw video game stream includes game state events and badges. In some embodiments, the game state events are event notifications and the badges are user notifications. In some embodiments, the ancillary game data is correlated with identifiers in the video game stream to form a game state timeline.

In some embodiments, the method also includes composing by the server the ancillary game data with the video game stream to create a composed video game stream. The game state timeline allows the ancillary game data to be synchronized with the raw video game stream in the composed video game stream.

In some embodiments, the method also includes synchronizing by the server streaming of the raw video game stream and another raw video game stream based on one of the game state events that is common to the two raw video game streams.

In some embodiments, the method also includes performing by the server a search function using a user input to search against all ancillary game data stored in the data store to find one or more raw video game streams that match the search query.

In some embodiments, the method also includes performing by the server a sort function using at least one of the game state events to organize a plurality of raw video game streams.

In another embodiment, a non-transitory computer-readable medium is provided. The non-transitory computer-readable medium stores instructions that, when executed by a computing device, cause the computing device to perform a method. The method includes communicatively coupling with a networked game play data store, wherein the game play data store stores raw video game streams, communicatively coupling with a networked game state data (GSD) data store, wherein the GSD data store stores ancillary game data associated with each of the raw video game streams, accessing by the computing device one of the raw video game streams from the game play data store, accessing by the computing the ancillary game data associated with the raw video game stream from the GSD data store, and composing by the computing device the raw video game stream and the ancillary game data that is associated with the raw video game stream to thereby create a composed video game stream for viewing.

In some embodiments, the method also includes synchronizing by the computing device streaming of at least two of the raw video game streams based on a common game state event associated with each of the at least two of the raw video game streams.

In some embodiments, the composed video game stream is viewed in a browser.

In some embodiments, the composed video game stream is viewed on the computing device.

In yet another embodiment, a non-transitory computer-readable medium is provided. The non-transitory computer-readable medium stores instructions that, when executed by a computing device, cause the computing device to perform a method. The method includes communicatively coupling with a networked game play data store, wherein the game play data store stores raw video game streams, communicatively coupling with a networked game state data (GSD) data store, wherein the GSD data store stores ancillary game data associated with each of the raw video game streams, and performing a user-requested function using at least a portion of all ancillary game data stored in the GSD data store.

In some embodiments, the user-requested function is a search function that uses a user input to search against all ancillary game data stored in the GSD data store to find one or more of the raw video game streams that match the search query.

In some embodiments, the user-requested function is a sort function that uses at least a portion of the ancillary game data to organize the raw video game streams.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Figure 1:
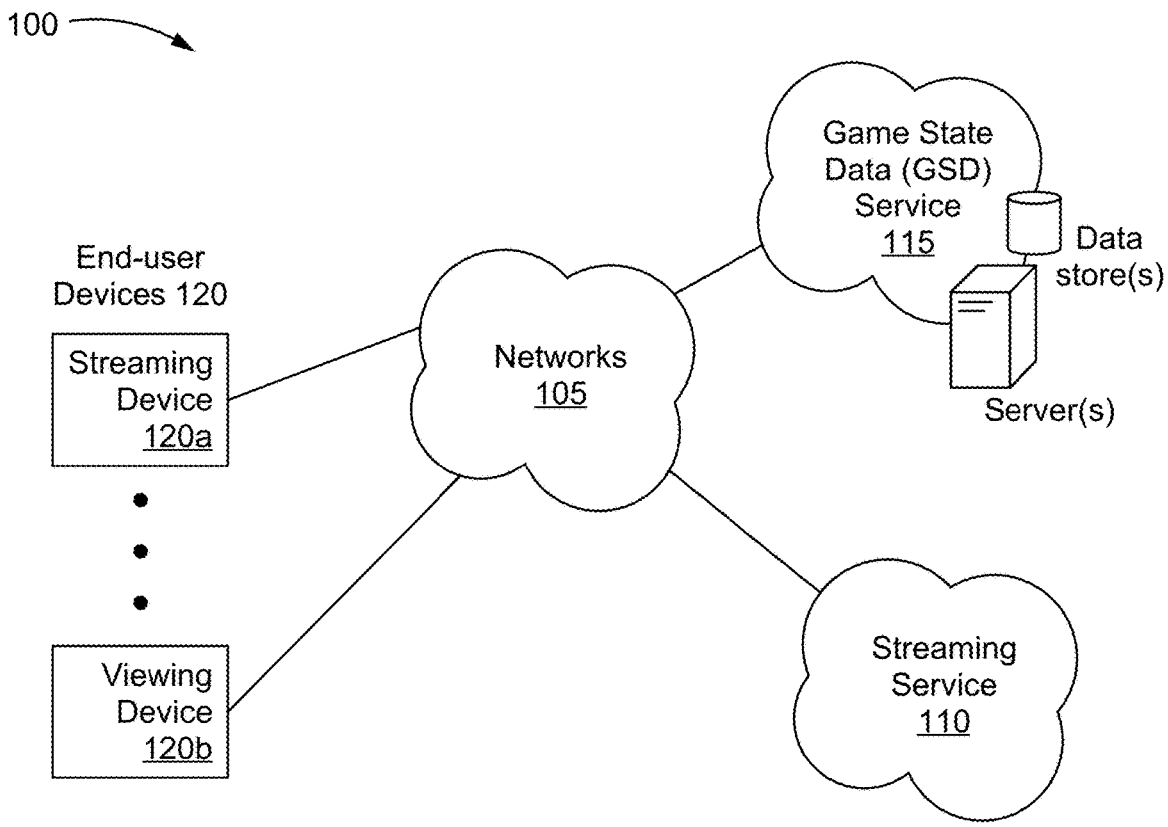
FIG. 1 illustrates an exemplary system in accordance with the some embodiments.

FIG. 1 illustrates an exemplary system 100 in accordance with the some embodiments. The system 100 includes a network(s) 105, a streaming service(s) 110, a game state data (GSD) service 115, and end-user devices 120. An exemplary network 105 is an Internet-based network. An exemplary streaming service 110 is provided by a third party source, such as TWITCH, HITBOX, or YOUTUBE, which stores and maintains raw video game streams of game plays streamed from any of the end-user devices 120. An exemplary GSD service 115 is provided by BLUESTACKS. Some embodiments of the GSD service 115 stores and maintains ancillary or out of band game data, including game state events and badges (visual/audio elements), associated with the raw video game streams that are stored by the streaming service 110. In some embodiments, ancillary game data is not bundled with raw game play footage. However, the ancillary game data can be bundled with raw game play footage. As described elsewhere herein, the GSD service 115 is implemented, in part, using server(s) and data store(s) (collectively and individually referred to as 115), which perform the methods discussed herein. The server 115 is an application server and/or web server, and the data store stores ancillary data associated with the raw video game streams.

The end-user devices 120 include a streaming device 120*a* configured to stream video game streams of game plays therefrom, and include a viewing device 120*b* configured to view video game streams of game plays, which can be live streams or archived streams. In FIG. 1, the streaming device 120*a* is shown as a separate device from the viewing device 120*b*. However, an end user device 120 can function as both a streaming device and a viewing device. Exemplary end-user devices include, but are not limited to, mobile devices, desktop computers, laptop computers, game consoles, handheld game devices, and other networked devices that are suitable for playing games and/or viewing video game streams.

Figure 2:
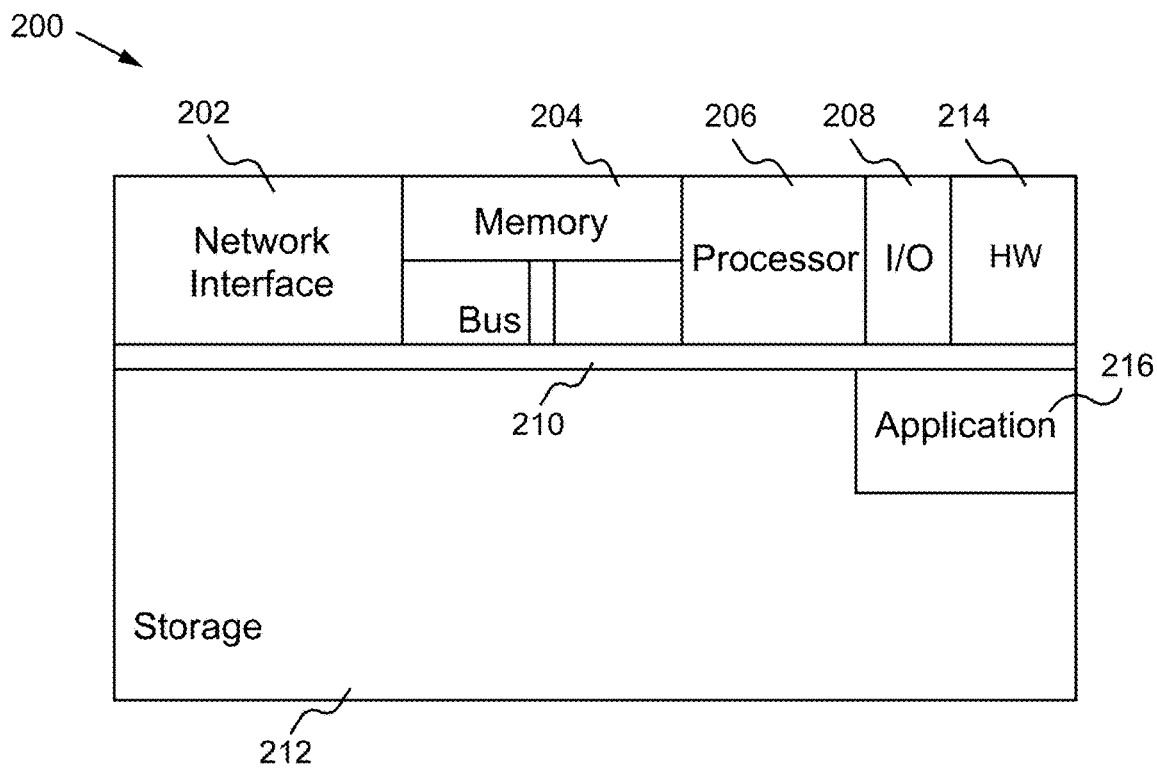
FIG. 2 illustrates a block diagram of an exemplary computing device in accordance with some embodiments.

FIG. 2 illustrates a block diagram 200 of an exemplary computing device in accordance with some embodiments. The computing device 200 is able to be used to acquire, cache, store, compute, search, transfer, communicate and/or display information. For example, the computing device 200 is able to execute procedures to switch operating systems. For another example, the computer device 200 is able to execute operating system specific applications.

In general, a hardware structure suitable for implementing the computing device 200 includes a network interface 202, a memory 204, processor(s) 206, I/O device(s) 208, a bus 210 and a storage device 212. The choice of processor is not critical as long as a suitable processor with sufficient speed is chosen. In some embodiments, the computing device 200 includes a plurality of processors 206. The memory 204 is able to be any conventional computer memory known in the art. The storage device 212 is able to include a hard drive, CDROM, CDRW, DVD, DVDRW, flash memory card, RAM, ROM, EPROM, EEPROM or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, display, printer, modem, touchscreen, button interface and other devices. Application(s) 216, such as those implementing the methods described herein, are likely to be stored in the storage device 212 and memory 204 and are processed by the processor 206. More or less components shown in FIG. 2 are able to be included in the computing device 200. In some embodiments, hardware 214 for implementing the methods described herein is included. Although the computing device 200 in FIG. 2 includes applications 216 and hardware 214 for the methods described herein, these procedures are able to be implemented on a computing device in hardware, firmware, software or any combination thereof. Each of the server 115 and the end-user device 120 can be similarly configured as the computing device 200.

Game state events are event notifications that can be used by the GSD service 115 to perform certain functions. Exemplary game state events of a game play are a game play started event, an attack started event, an attack finished event, a goal scored event, a goal conceded event, a level finished event and a level failed event, to name a few. Other game state events are possible. Associated game state events for a raw game play footage are correlated with time stamps and/or frame indices in the raw game play footage to form a game state timeline such that the game state events can be synchronized with that raw game play footage during subsequent viewing(s) of the game play. The game state events can also be used to search or sort video game streams, or to perform data mining.

Game state events of a game play can be created or obtained via one or more of a plurality of mechanisms. It should be noted that the mechanisms described herein are not exhaustive. Other mechanisms to create or obtain game state events are contemplated.

One mechanism to create game state events is a manual process. The manual process involves a user watching a raw video game footage or stream of a game play to determine and record interesting events (e.g., where a streamer/player died, where the streamer/player picked up a weapon, etc.) in the game play, thereby creating ancillary game data that is associated with the stream. The ancillary game data associated with the stream is eventually stored and maintained by the GSD service for later retrieval.

Another mechanism to create game state events is an automated process. In some embodiments, the automated process involves a module that is programmed to perform image processing, object detection, optical character recognition (OCR) and other necessary processing on a raw video game footage or stream of a game play to automatically determine and record interesting events in the game play, thereby creating ancillary game data associated with the stream. The ancillary game data is eventually stored by the GSD service for later retrieval.

Figure 3A:
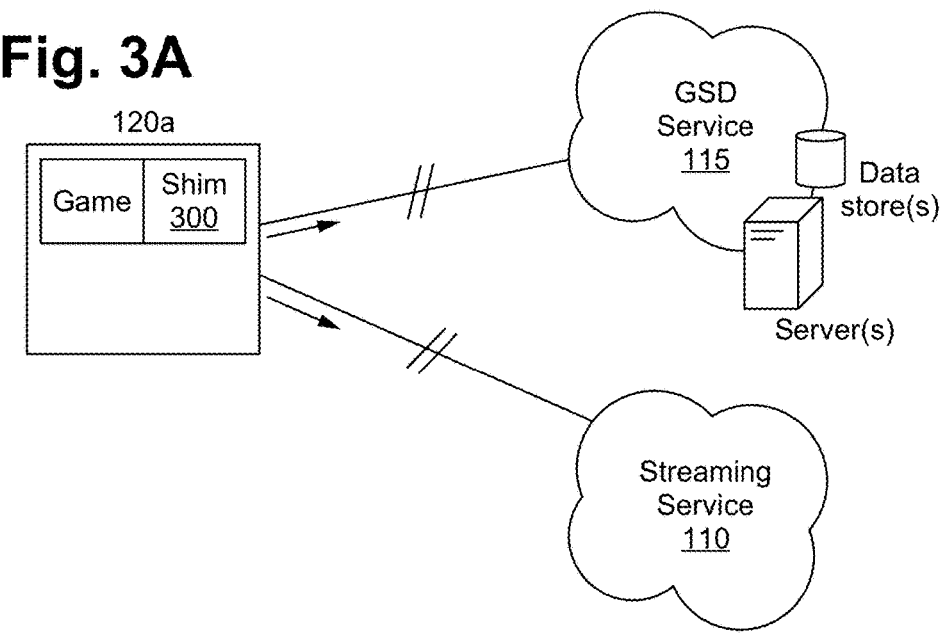
FIGS. 3A-3E illustrate exemplary automated mechanisms in accordance with some embodiments.

In some embodiments, the module is configured as a "shim" 300 that is installed on the streaming device 120a, as illustrated in FIG. 3A. Each video game stream being streamed from the streaming device 120a to the streaming service 110, is first passed through the shim 300 that is running on the streaming device 120a. The shim 300 processes the raw video game stream as the stream is going outbound from the streaming device 120a. The shim 300 transmits the ancillary game data that is associated with the stream to the GSD service 115 to be stored for later retrieval. The shim 300 can transmit the ancillary game data to the GSD service 115 periodically during game play, once at the end of the game play, and/or as the ancillary game data is being collected.

Figure 3B:
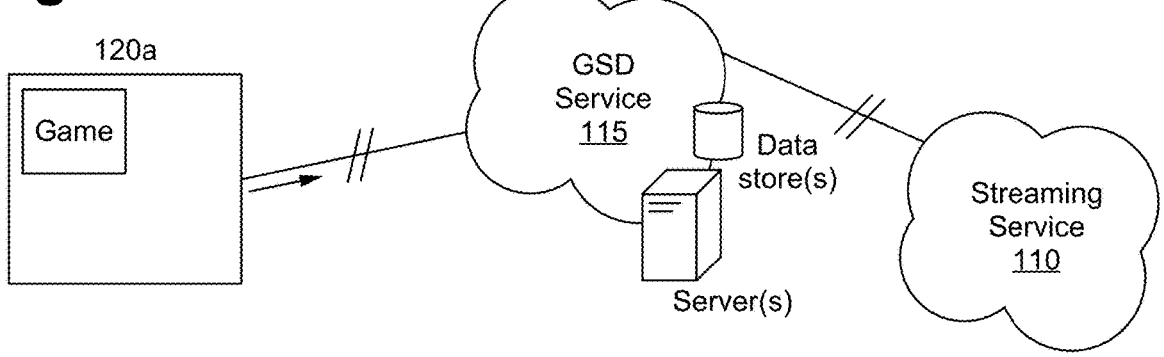
Figure 3C:
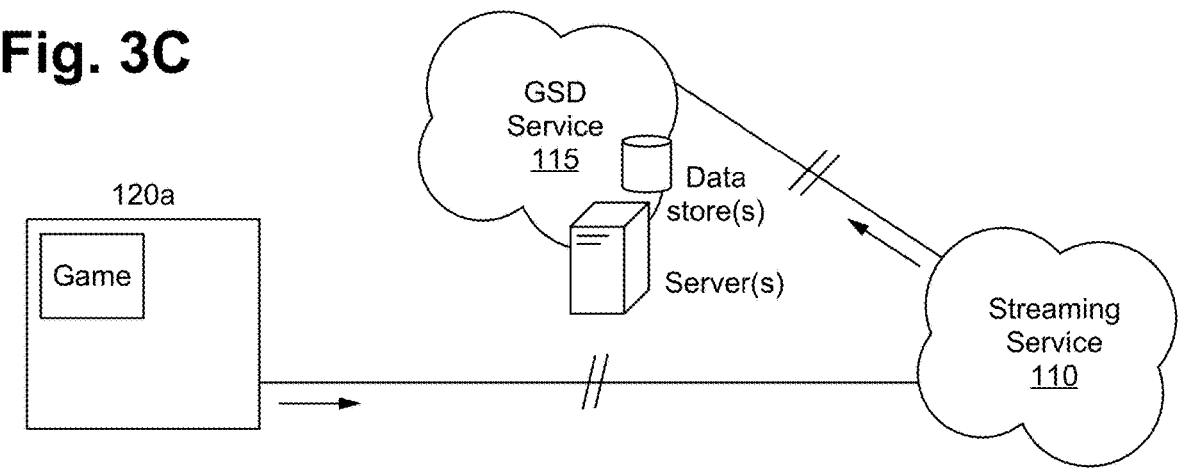

In some embodiments, the module is installed in the server of the GSD service 115. In one variant, as illustrated in FIG. 3B, each video game stream is streamed from the streaming device 120a indirectly to the streaming service 110 via the server 115. In other words, the server 115 behaves as an intermediary device, wherein each video game stream being streamed from the streaming device 120a to the streaming service 110 is first streamed to the server 115. The server 115 processes the raw video game stream as it arrives inbound from the streaming device 120a and, in turn, streams the raw video game stream to the streaming service 110. In another variant, as illustrated in FIG. 3C, each video game stream is streamed from the streaming device 120a directly to the streaming service 110, which in turn provides the raw video game stream to the server 115. The server 115 processes the raw video game stream as the stream is arriving inbound from the streaming service 110. The video game stream can be a live stream that is mirrored to the GSD service 115 by the streaming service 110, or can be an archived stream that is later pulled or otherwise accessed by the GSD service 115 after a new stream notification is generated by the streaming service 110. In both variants, the ancillary game data that is associated with the stream is stored by the GSD service 115 for later retrieval.

Figure 3D:
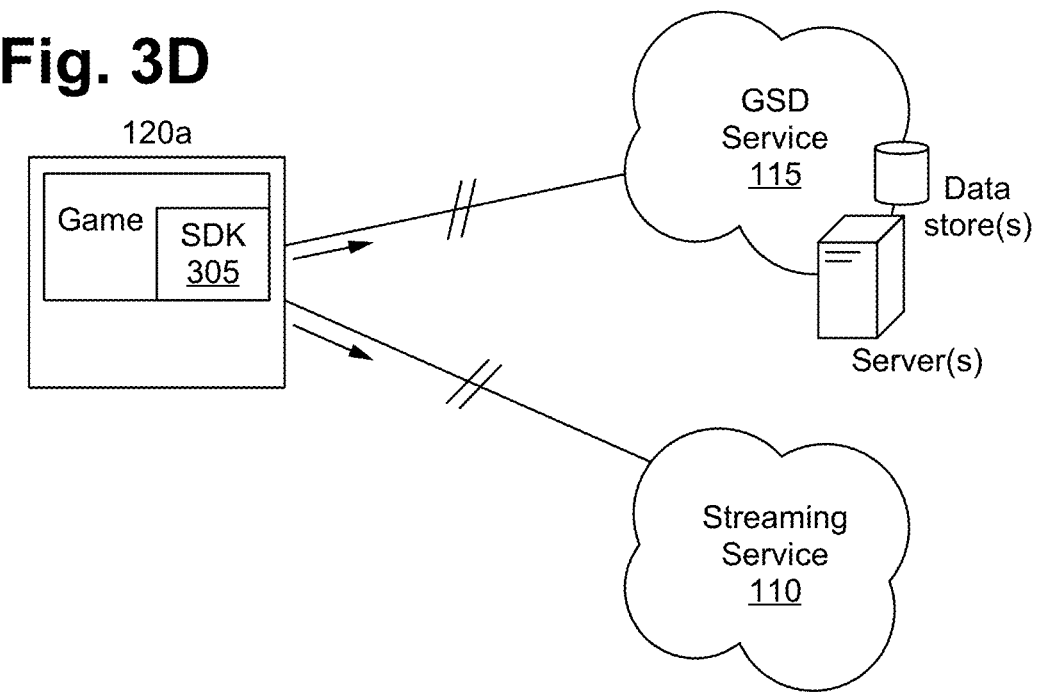

In some embodiments, as illustrated in FIG. 3D, the automated process involves a software development kit (SDK) 305, which can be provided by the GSD service 115 to game developers, to be integrated with games during game development. The SDK 305 provides an interface, which a game can be programmed to, to help link game state events with a game play. While the game play is streamed to the streaming service 110, the ancillary game data that is associated with the steam is provided to the GSD service 115 to be stored for later retrieval. The SDK 305 can transmit the ancillary game data to the GSD service 115 periodically during game play, once at the end of the game play, and/or as the ancillary game data is being collected. Typically, the game, including the SDK 305, is installed on the streaming device 120a.

Figure 3E:
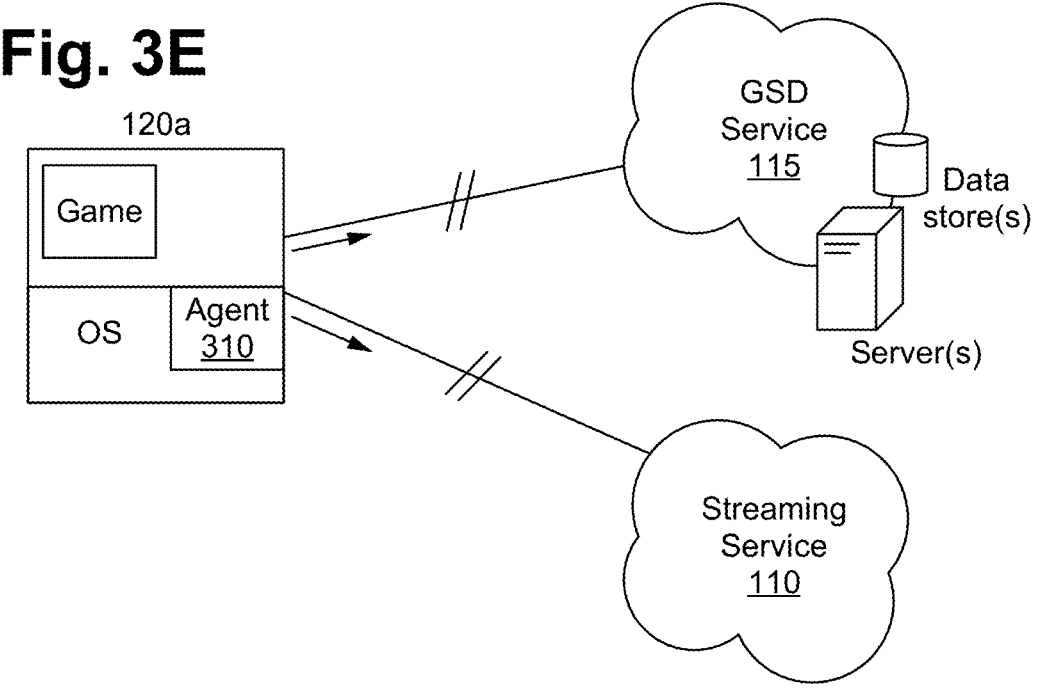

In some embodiments, as illustrated in FIG. 3E, the automated process involves a certified back agent 310, which can be provided by the GSD service 115, to be integrated with the operating system that a game is running in on the streaming device 120a. The agent 310 is configured to read private game states that are output by the game to persistent storage on the streaming device 120a. While the game play is streamed to the streaming service 110, the ancillary game data that is associated with the steam is provided to the GSD service 115 to be stored for later retrieval. The agent 310 can transmit the ancillary game data to the GSD service 115 periodically during game play, once at the end of the game play, and/or as the ancillary game data is being collected. In some embodiments, the agent 310 is included as part of BLUESTACKS' application player (AppPlayer). The AppPlayer is disclosed in the co-pending U.S. patent application Ser. No. 13/479,086, entitled "Apparatuses, Systems and Methods of Switching Operating Systems," filed on May 23, 2012, and in the U.S. Pat. No. 8,924,958, entitled "Application Player," issued on Dec. 30, 2014, which are hereby incorporated by reference in their entirety.

As discussed above, game state events of a game play can be created or obtained via a plurality of mechanisms. For example, an automated process can be first performed on a raw video game stream to obtain a first set of game state events, and a manual process can be later performed on the raw video game stream to obtain second set of game events. All sets become part of the ancillary game data for that raw video game stream.

Figure 4:
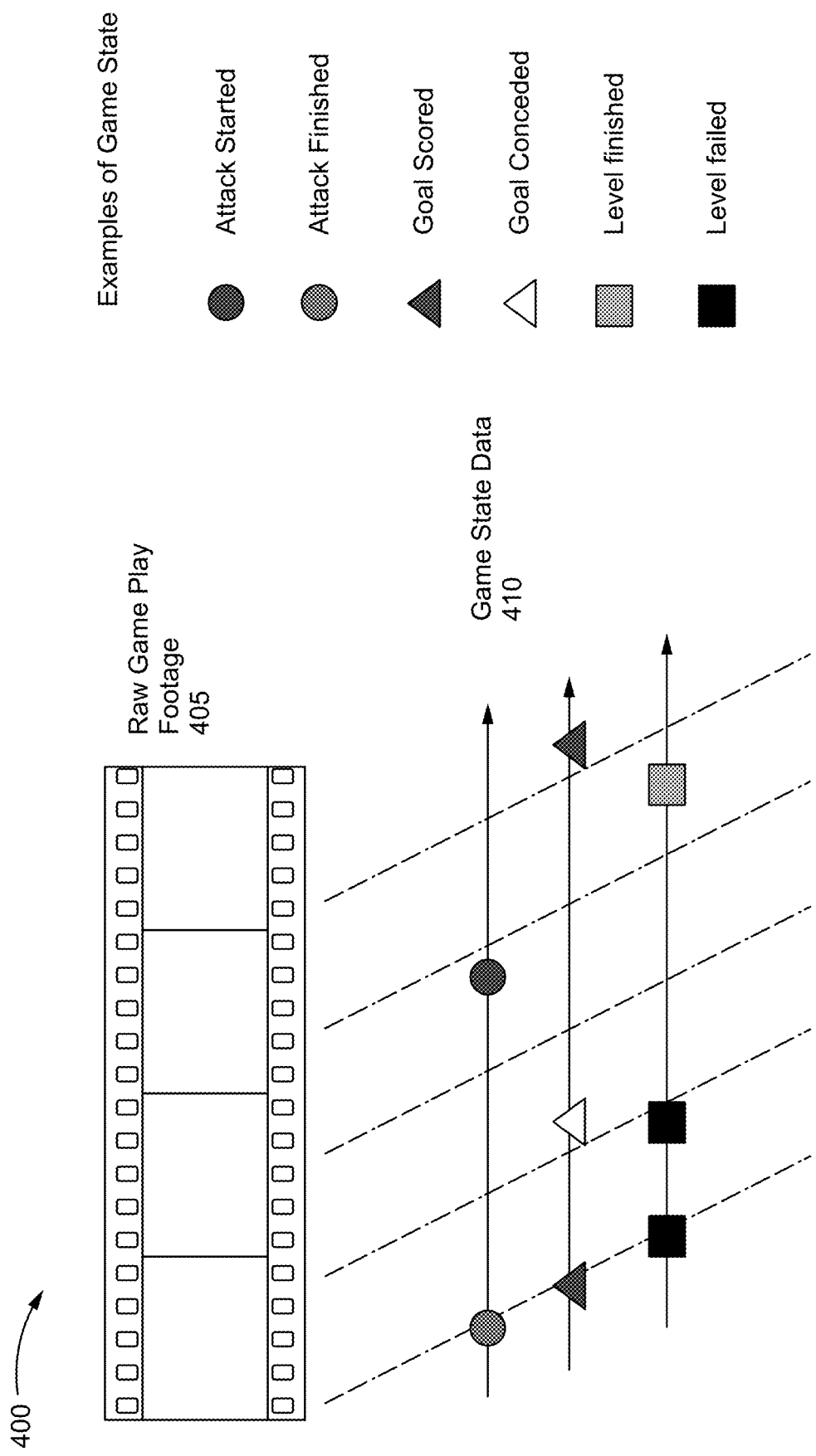
FIG. 4 illustrates a diagram of exemplary game state data added to a video game stream of a game play in accordance with some embodiments.

FIG. 4 illustrates a diagram 400 of exemplary game state data added to a video game stream of a game play in accordance with some embodiments. A raw game play footage 405 is stored and provided by the streaming service 410. Game state events 410 associated with the raw game play footage 405 are stored and provided by the GSD service 115. The raw game play footage 405 and the game state events 410 into a new composed video game stream during a viewing consumption of the game play on the viewing device 120b of FIG. 1. In particular, the game state timeline of the associated game state events 410 is synchronized with the raw game play footage 405. As discussed elsewhere, the composition of the game state events 410 and the raw game play footage 405 can be performed by the GSD service 115 or by a client application.

Figure 5:
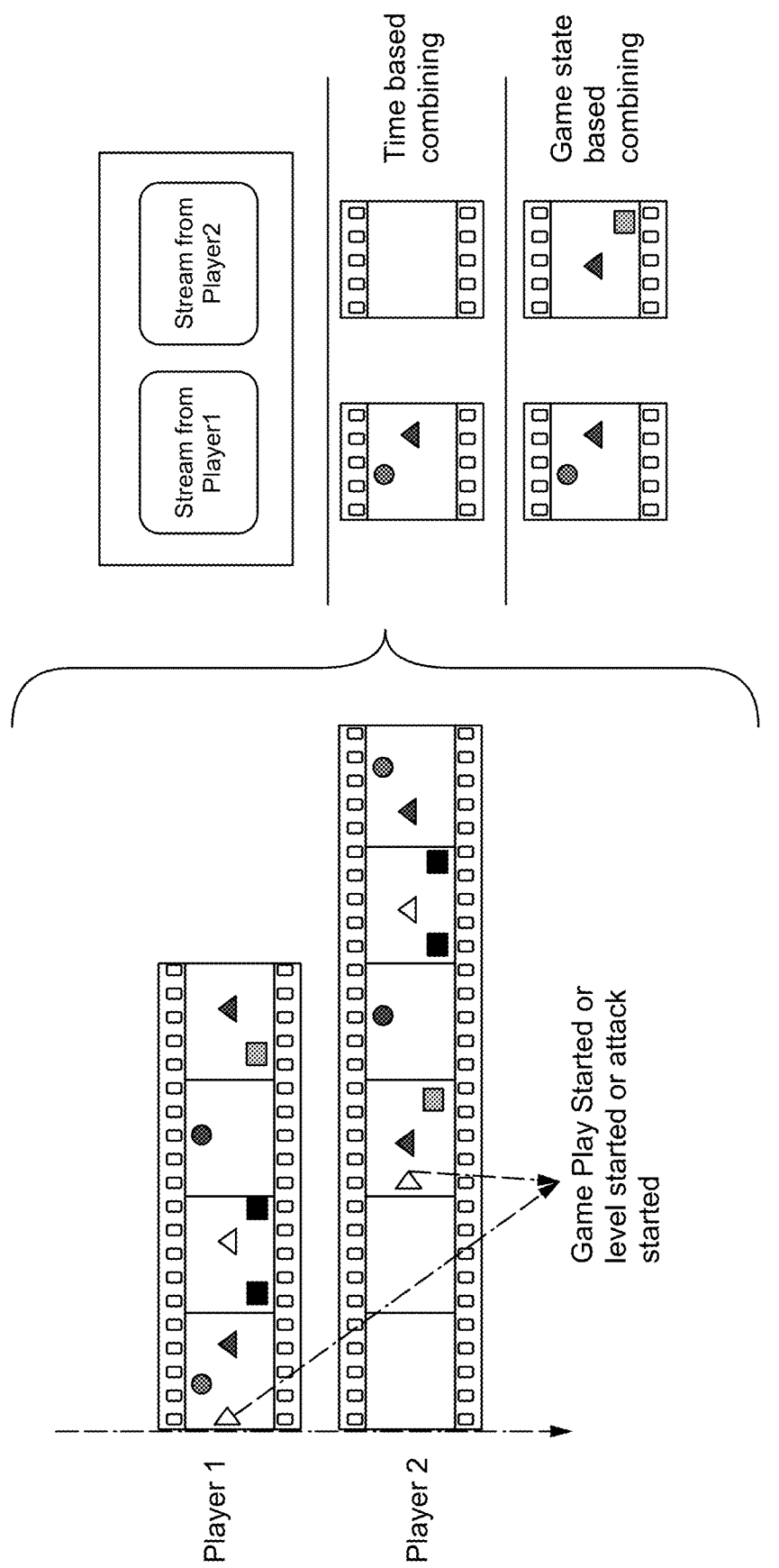
FIG. 5 illustrates a diagram of synchronization across a plurality of video game streams in accordance with some embodiments.

Adding game state data to a video game stream has numerous benefits. For example, traditionally, there is no easy way to time synchronization of two simultaneous video game streams. A viewer, who wants to watch two video game streams side-by-side, must hit the play button on a first video game stream and, at a moment in time in the first video game stream that matches with a same moment in time in a second video game stream, must hit the play button on the second video game stream. Yet, this manual process can be frustrating and does not guarantee that the two streams will be synchronized. However, game state events across two or more different video game streams can be advantageously used to synchronize the different video game streams for the purpose of viewing. FIG. 5 illustrates a diagram 500 of synchronization across a plurality of video game streams in accordance with some embodiments. In some embodiments, the GSD service obtains stored game state events that are associated with each of the video game streams to be synchronized, and synchronizes the video game streams based on a common game state event, such as a game play started event, for viewing the video game streams side by side. In addition, the viewer can selectively choose to view from any synchronization point between the video game streams. In FIG. 5, only two video game streams are illustrated for purposes of discussion. However, three or more video game streams can be synchronized using game state events associated with the video game streams to be synchronized. Synchronization across multiple video game streams advantageously enhances the viewer's experience while viewing side-by-side video game streams.

Figure 6:
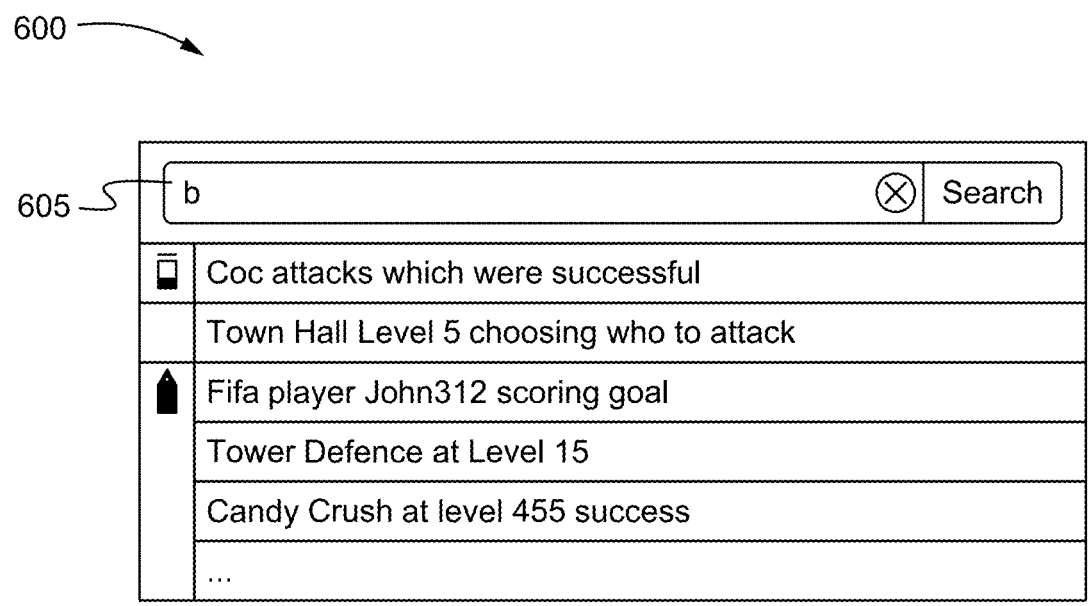
FIG. 6 illustrates an exemplary search interface in accordance with some embodiments.

Game state events can be used by the viewer to perform a smart search for events and achievements associated with game plays, to perform a smart sort by events or achievements associated with game plays, and to perform general data mining. FIG. 6 illustrates an exemplary search interface 600 in accordance with some embodiments. The search interface 600 includes a search box 605 where the viewer can enter a search query, such as "Town Hall Level 5 choosing who to attack" pertaining to the Clash of Clans game. The GSD service receives the search query and performs data mining on past player performances to retrieve from the streaming service (via an API provided by the streaming service) archived video game streams of Clash of Clans game plays that best match the search query. The viewer can select an archived video game stream and, perhaps, start viewing from the "level 5 town hall attack" game event, instead from the beginning of the archived video game stream.

In some embodiments, ancillary game data not only includes game state events but can also badges. Badges are user notifications. A badge can be a visual element, an audio element or both. For example, if the streamer accomplishes a certain goal, a "good job" badge can be created and associated with a raw game play stream. For another example, if the streamer is running out of a game resource, a "help your friend" badge can be created and associated with the raw game play stream, to encourage viewer(s) to donate resources to the streamer so that the streamer can continue with the game play, thereby advantageously enhancing the streamer's streaming experience. For yet another example, if the streamer does not complete a level, an "encouragement" badge is created as motivation and associated with the raw game play stream. Other badges are contemplated. These different badges are also correlated with time stamps and/or frame indices in the raw game play footage such that the badges can be synchronized with the raw game play footage during subsequent viewing(s) of the game play. Badges can be created or obtained using one or more of the mechanisms described above pertaining to game state events. A smart stream is a composed stream of raw footage with at least a portion of the ancillary game data, such as badges, associated with the raw footage.

Figure 7:
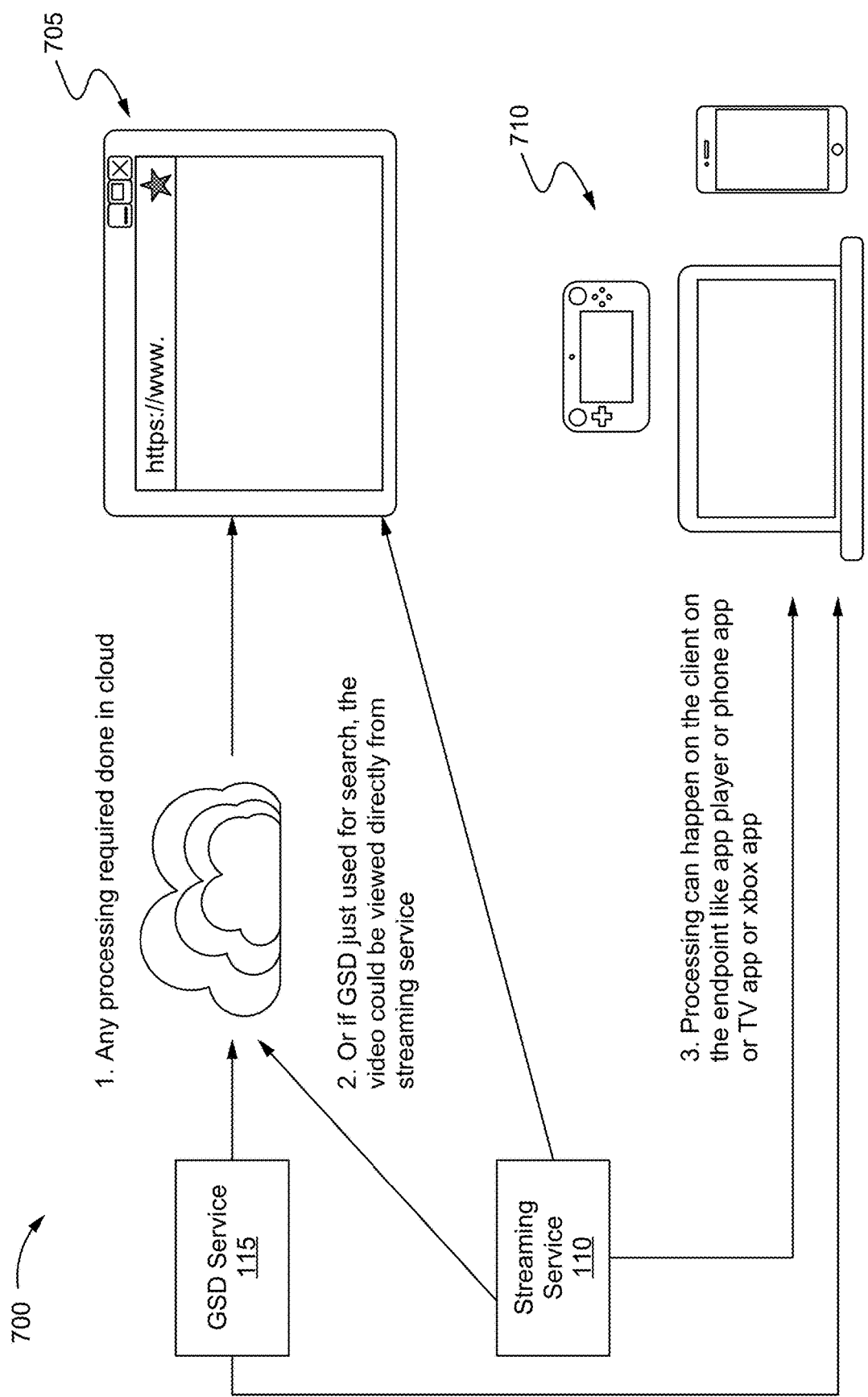
FIG. 7 illustrates a diagram of exemplary viewing mechanisms in accordance with some embodiments.

FIG. 7 illustrates a diagram 700 of exemplary viewing mechanisms in accordance with some embodiments. One viewing mechanism is via a web browser 705 on an end-user device. In some embodiments, any processing required is done by the GSD service 115. In particular, ancillary game data accessed from the data store 115 is combined with a corresponding raw or original media stream accessed from the streaming service 110 by GSD service 115, thereby generating a smart media stream for viewers to consume in the web browser 705. If game state events are just used for searching, viewers can consume in the web browser 705 raw or original video game streams directly from the streaming service 110 in the web browser 705.

Another viewing mechanism is via a stand-alone application 710 running on an end-user device. In some embodiments, any processing required is done by this client application 710. In particular, ancillary game data accessed from the data store 115 is combined with a corresponding raw or original media stream accessed from the streaming service 110 by the stand-alone application 710, thereby generating a smart media stream for viewers to consume in the stand-alone application 710. An exemplary stand-along application 710 is the AppPlayer.

Figure 8A:
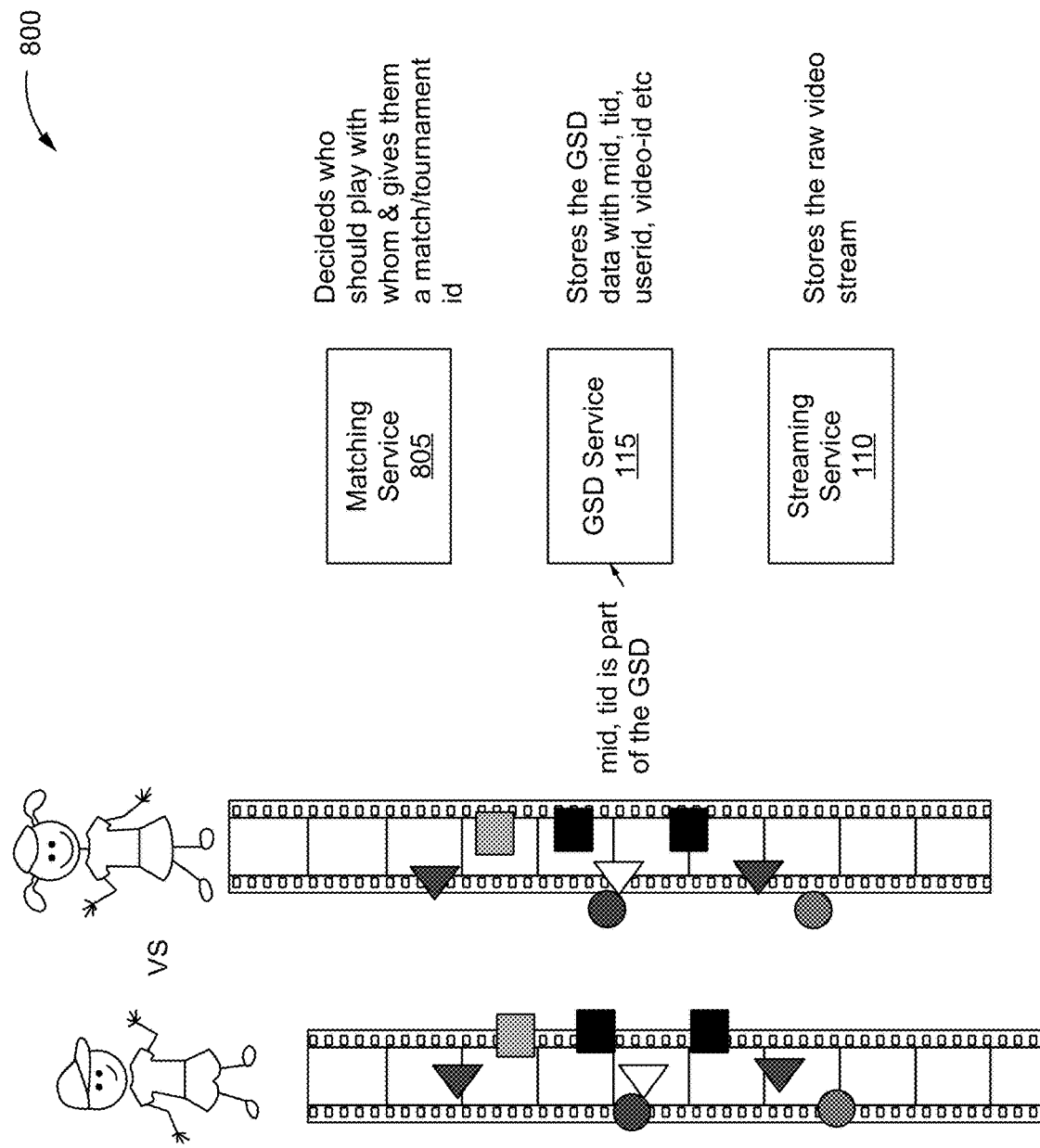
FIGS. 8A-8B illustrate different stacks of technologies in accordance with some embodiments.
Figure 8B:
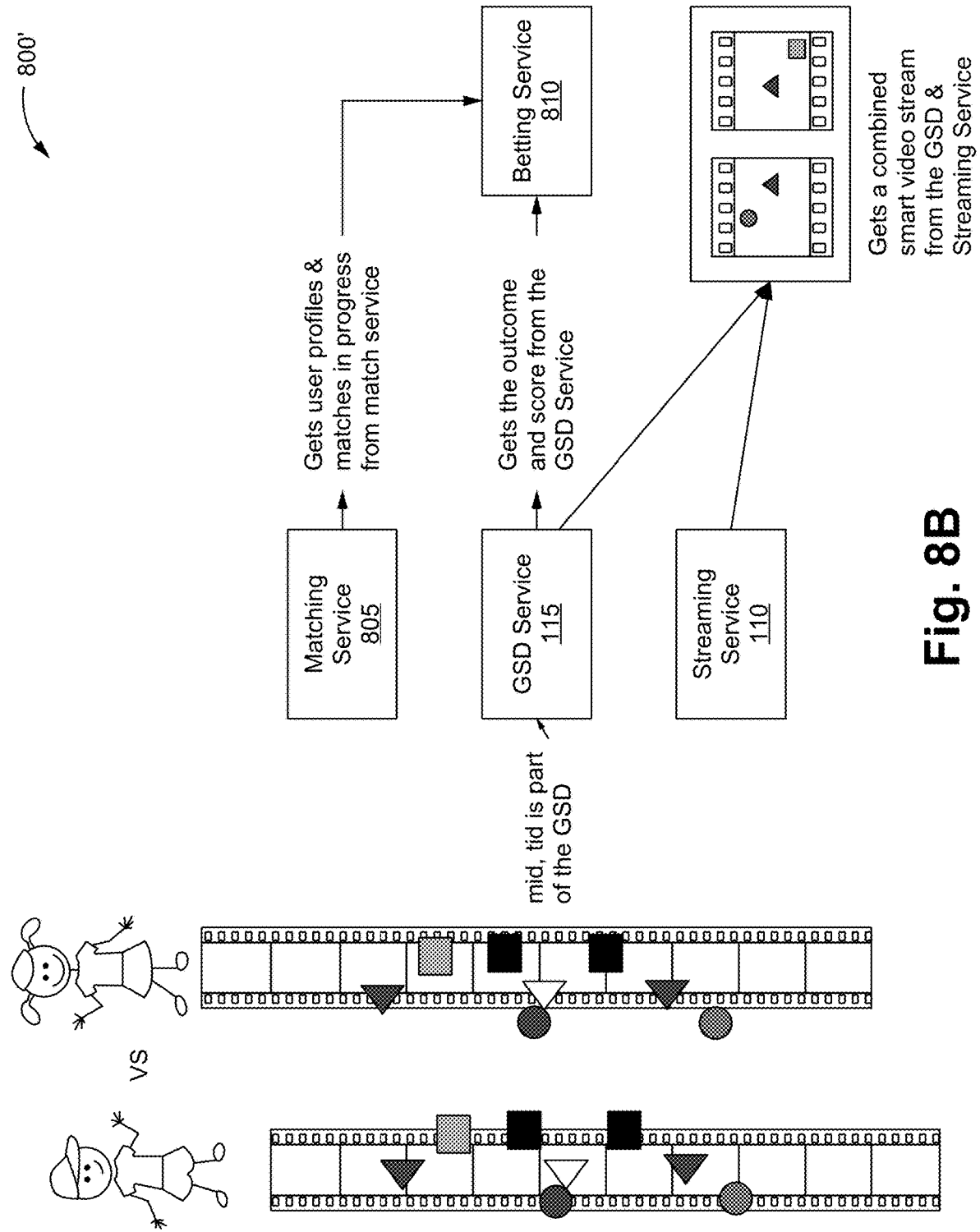

FIGS. 8A-8B illustrate different stacks of technologies 800, 800' in accordance with some embodiments. In FIG. 8A, the stack of technologies 800 includes the streaming service 110, the GSD service 115, and a matching service(s) 805. As described above, the streaming service 110 is provided by a third party source, such as TWITCH, HITBOX, or YOUTUBE, which stores and maintains raw or original video game streams of game plays, and the GSD service 115 is provided by BLUESTACKS, which stores and maintains ancillary or out of band data, including game state events and visual/audio elements, associated with the raw video game streams stored by the streaming service 110. A matching service 805, which is separate from the streaming service 110 and the GSD service 115, identifies players that are about the same level to compete with each other in a game and assigns those players with a match/tournament identifier. In some embodiments, the GSD service 115 can associate the video game streams of the players when the players are competing based on the match/tournament identifier and, as such, is able to provide viewer(s) with the ability to switch between the video game streams, or to show the video game streams simultaneously from the different players' perspectives.

In FIG. 8B, the stack of technologies 800' includes the different services 110, 115, 805 from FIG. 8A and a betting service 810. The betting service 810 receives matching data (e.g., user profiles and competitions in progress) from the matching service 805, and receives ancillary game data describing game outcomes from the GSD service 115. If a gambler knows that Player A and Player B are to compete, the gambler can first research the players by watching their past performances using the GSD service 115 to thereby determine who to bet on. In some embodiments, the GSD service 115 can also provide odds by performing data mining on the ancillary game data.

Figure 9:
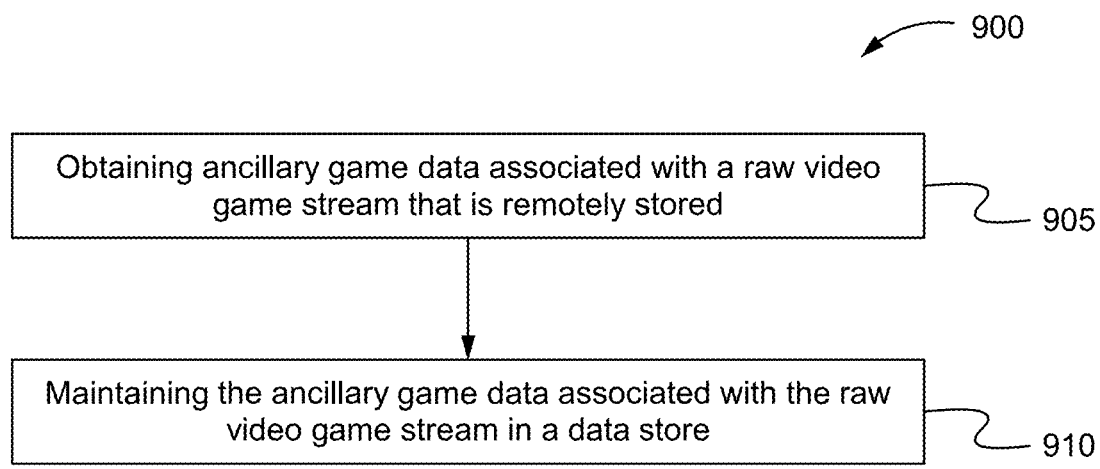
FIG. 9 illustrates an exemplary method in accordance with some embodiments.

FIG. 9 illustrates an exemplary method 900 in accordance with some embodiments. The method 900 is performed by the server 115 of FIG. 1. At a Step 905, the server obtains ancillary game data that is associated with a raw video game stream. The raw video game stream is stored remotely from the server.

In some embodiments, the ancillary game data is obtained by the server by the server communicatively coupling with an end-user streaming device over a network, and receiving the ancillary game data from the end-user streaming device. The end-user streaming device collects the ancillary game data either via a shim installed on the end-user streaming device, a SDK that is integrated with the game, or an agent integrated in the operating system that the game is running in on the end-user streaming device.

In some embodiments, the ancillary game data is obtained by the server by the server accessing the raw video game stream over a network, and performing image processing on the raw video game stream, thereby creating the ancillary game data that is associated with the raw video game stream. In accessing the raw video game stream over the network, the server can receive the raw video game stream directly streamed from an end-user streaming device, and after the image processing, transmits the raw video game stream to a streaming service over the network. Alternatively, the server can communicatively couple with the streaming service over the network, and receive the raw video game stream streamed from the streaming service.

The ancillary game data associated with the raw video game stream includes game state events and badges. The game state events are event notifications and the badges are user notifications. The ancillary game data is correlated with identifiers in the video game stream to form a game state timeline.

At a Step 910, the server maintain the ancillary game data associated with the raw video game stream in a data store that is communicatively coupled with the sever.

In some embodiments, processing is performed by the server. The server can compose the ancillary game data with the video game stream to create a composed video game stream. The game state timeline allows the ancillary game data to be synchronized with the raw video game stream in the composed video game stream. The server can also synchronize streaming of the raw video game stream and another raw video game stream based on one of the game state events that is common to the two raw video game streams. The server can also perform a search function using a user input to search against all ancillary game data stored in the data store to find one or more raw video game streams that match the search query. The server can also perform a sort function using at least one of the game state events to organize a plurality of raw video game streams. Alternatively, the processing is performed on an end-user device by communicatively coupling with the streaming service and the server (and the data store) to retrieve video game streams and ancillary game data from the streaming service and the data store, respectively.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A non-transitory computer readable medium storing instructions that, when executed by a server, cause the server to perform a method comprising:
   receiving ancillary game data associated with a raw video game stream that is generated at a video game-executing processor-implemented end-user streaming device, wherein raw video game stream data corresponding to the generated raw video game stream does not include the ancillary game data and is stored remotely from the server;
   generating one or more correlations between the received ancillary game data and game play footage identifiers in the raw video game stream data;
   maintaining by the server, the ancillary game data associated with the raw video game stream in a data store that is communicatively coupled with the server; and
   responsive to receiving user input identifying an item of the ancillary game data, implementing at a processor-implemented end-user device, a game stream data display event, wherein implementing the game stream data display event comprises retrieving and displaying, on a display device coupled with the processor-implemented end-user device, selected raw video game stream data, and wherein selection of the selected raw video game stream data for display is based on a game play footage identifier of the game play footage identifiers that is correlated with the identified item of the ancillary game data;
   wherein the ancillary game data associated with the raw video game stream comprises at least one of:
      one or more game state events, each game state event comprising an event notification corresponding to an event within a video game to which the raw video game stream data corresponds; and
      one or more badges, each badge comprising a user notification corresponding to the video game; and
   wherein the game stream data display event comprises synchronizing display of a first set of game play footage from the raw video game stream with display of a second set of game play footage from another raw video game stream on the display device coupled with the processor-implemented end-user device, wherein the first set of game play footage and the second set of game play footage are respectively correlated with a common game state event or a common badge.

2. The non-transitory computer readable medium as claimed in claim 1, wherein the ancillary game data associated with the generated raw video game stream comprises one or more recorded game state events, each of the one or more recorded game state events comprising a processor-generated event notification, wherein recording any of the one or more game state events comprises:
   identifying through image processing implemented on the generated raw video game stream, a game state event within the generated raw video game stream; and
   recording the identified game state event as a second item of the ancillary game data corresponding to the generated raw video game stream.

3. The non-transitory computer readable medium as claimed in claim 2, wherein recording any of the one or more game state events comprises correlating the identified game state event with at least one of a time stamp value or a frame index value corresponding to the raw video game stream.

4. The non-transitory computer readable medium as claimed in claim 1, wherein the game stream data display event comprises:
   generating a composed video stream that is distinct from the raw video game stream, wherein the composed video stream combines game play footage from the raw video game stream with the ancillary game data associated with the raw video game stream; and
   displaying the composed video stream on the processor-implemented end-user device.

5. The non-transitory computer readable medium as claimed in claim 1, wherein the game stream data display event comprises:
- performing a search based on a received search query, for identifying any of the raw video game stream data generated at one or more processor-implemented end-user streaming devices that is associated with ancillary game data that matches the received search query; and
- displaying game play footage from the raw video game stream data that has been identified based on the performed search.

6. The non-transitory computer readable medium as claimed in claim 1, wherein the game stream data display event includes:
- performing a sort function based on a received sort input, wherein performing the sort function comprises organizing a plurality of raw video game streams generated at one or more processor-implemented end-user streaming devices, and said organizing is based on ancillary data corresponding to each of the plurality of raw video game streams.

7. A method for streaming game play data, the method comprising, at a server:
- receiving ancillary game data associated with a raw video game stream that is generated at a video game-executing processor-implemented end-user streaming device, wherein raw video game stream data corresponding to the raw video game stream does not include the ancillary game data, and is stored remotely from the server;
- generating one or more correlations between the received ancillary game data and game play footage identifiers in the raw video game stream data;
- maintaining by the server, the ancillary game data associated with the raw video game stream in a data store that is communicatively coupled with the server; and
- responsive to receiving user input identifying an item of the ancillary game data, implementing at a processor-implemented end-user device, a game stream data display event, wherein implementing the game stream data display event comprises retrieving and displaying, on a display device coupled with the processor-implemented end-user device, selected raw video game stream data, and wherein selection of the selected raw video game stream data for display is based on a game play footage identifier of the game play footage identifiers that is correlated with the identified item of the ancillary game data;
- wherein the ancillary game data associated with the raw video game stream comprises at least one of:
  - one or more game state events, each game state event comprising an event notification corresponding to an event within a video game to which the raw video game stream data corresponds; and
  - one or more badges, each badge comprising a user notification corresponding to the video game;
- and wherein the game stream data display event comprises synchronizing display of a first set of game play footage from the raw video game stream with display of a second set of game play footage from another raw video game stream on the display device coupled with the processor-implemented end-user device, wherein the first set of game play footage and the second set of game play footage are respectively correlated with a common game state event or a common badge.

8. The method as claimed in claim 7, wherein the ancillary game data associated with the generated raw video game stream comprises one or more recorded game state events, each of the one or more recorded game state events comprising a processor-generated event notification, wherein recording any of the one or more of the game state events comprises:
- identifying through image processing implemented on the generated raw video game stream, a game state event within the generated raw video game stream; and
- recording the identified game state event as a second item of the ancillary game data corresponding to the generated raw video game stream.

9. The method as claimed in claim 8, wherein recording any of the one or more game state events further comprises correlating the identified game state event with at least one of a time stamp value or a frame index value corresponding to the raw video game stream.

10. The method as claimed in claim 7, wherein the game stream data display event comprises:
- generating a composed video stream that is distinct from the raw video game stream, wherein the composed video stream combines game play footage from the raw video game stream with the ancillary game data associated with the raw video game stream; and
- displaying the composed video stream on the processor-implemented end-user device.

11. The method as claimed in claim 7, wherein the game stream data display event comprises:
- performing a search based on a received search query, for identifying any of the raw video game stream data generated at one or more processor-implemented end-user streaming devices that is associated with ancillary game data that matches the received search query; and
- displaying game play footage from the raw video game stream data that has been identified based on the performed search.

12. The method as claimed in claim 7, wherein the game stream data display event includes:
- performing a sort function based on a received sort input, wherein performing the sort function comprises organizing a plurality of raw video game streams generated at one or more processor-implemented end-user streaming devices, and said organizing is based on ancillary data corresponding to each of the plurality of raw video game streams.

13. A system for streaming game play data, the system comprising at least one server configured for:
- receiving ancillary game data associated with a raw video game stream that is generated at a video game-executing processor-implemented end-user streaming device, wherein raw video game stream data corresponding to the generated raw video game stream does not include the ancillary game data, and is stored remotely from the server;
- generating one or more correlations between the received ancillary game data and game play footage identifiers in the raw video game stream data;
- maintaining by the server, the ancillary game data associated with the raw video game stream in a data store that is communicatively coupled with the server; and
- responsive to receiving user input identifying an item of the ancillary game data, implementing at a processor-implemented end-user device, a game stream data display event, wherein implementing the game stream data display event comprises retrieving and displaying, on a display device coupled with the processor-implemented end-user device, selected raw video game stream data, and wherein selection of the selected raw video game stream data for display is based on a game play footage identifier of the game play footage identifiers that is correlated with the identified item of the ancillary game data;

wherein the ancillary game data associated with the raw video game stream comprises at least one of:

one or more game state events, each game state event comprising an event notification corresponding to an event within a video game to which the raw video game stream data corresponds; and one or more badges, each badge comprising a user notification corresponding to the video game;

and wherein the game stream data display event comprises synchronizing display of a first set of game play footage from the raw video game stream with display of a second set of game play footage from another raw video game stream on the display device coupled with the processor-implemented end-user device, wherein the first set of game play footage and the second set of game play footage are respectively correlated with a common game state event or a common badge.

14. The system as claimed in claim 13, wherein the ancillary game data associated with the generated raw video game stream comprises one or more recorded game state events, each of the one or more recorded game state events comprising a processor-generated event notification, wherein recording any of the one or more game state events comprises:

identifying through image processing implemented on the generated raw video game stream, a game state event within the generated raw video game stream; and recording the identified game state event as a second item of the ancillary game data corresponding to the generated raw video game stream.

15. The system as claimed in claim 14, wherein recording any of the one or more game state events further comprises correlating the identified game state event with at least one of a time stamp value or a frame index value corresponding to the raw video game stream.

16. The system as claimed in claim 13, wherein the game stream data display event comprises:

generating a composed video stream that is distinct from the raw video game stream, wherein the composed video stream combines game play footage from the raw video game stream with the ancillary game data associated with the raw video game stream; and displaying the composed video stream on the processor-implemented end-user device.

17. The system as claimed in claim 13, wherein the game stream data display event comprises:

performing a search based on a received search query, for identifying any of the raw video game stream data generated at one or more processor-implemented end-user streaming devices that is associated with ancillary game data that matches the received search query; and displaying game play footage from the raw video game stream data that has been identified based on the performed search.

18. The system as claimed in claim 13, wherein the game stream data display event includes:

performing a sort function based on a received sort input, wherein performing the sort function comprises organizing a plurality of raw video game streams generated at one or more processor-implemented end-user streaming devices, and said organizing is based on ancillary data corresponding to each of the plurality of raw video game streams.

* * * * *